United States Patent [19]

Nomura et al.

[11] Patent Number: 5,349,408
[45] Date of Patent: Sep. 20, 1994

[54] ZOOM LENS CAMERA WITH DRIVE MOTOR AND GEAR TRAIN

[75] Inventors: Hiroshi Nomura; Norio Sato; Nobuaki Aoki, all of Tokyo, Japan

[73] Assignee: Asahi Kogaku Kogyo Kabushiki Kaisha, Tokyo, Japan

[21] Appl. No.: 46,734

[22] Filed: Apr. 16, 1993

[30] Foreign Application Priority Data

Apr. 17, 1992 [JP] Japan ............................ 4-024853[U]
Apr. 17, 1992 [JP] Japan ................................ 4-098260

[51] Int. Cl.⁵ ........................ G03B 5/00; G03B 17/02
[52] U.S. Cl. .................................. 354/195.1; 354/288
[58] Field of Search ............... 354/195.1, 195.12, 288

[56] References Cited

U.S. PATENT DOCUMENTS

| Re. 2,261 | 5/1993 | Haraguchi et al. | 354/195.12 X |
|---|---|---|---|
| 4,353,634 | 10/1982 | Himmelsbach | 354/195.1 |
| 4,419,000 | 12/1983 | Yoshida et al. | 354/173.1 |
| 4,491,396 | 1/1985 | Isobe et al. | 354/400 X |
| 4,944,030 | 7/1990 | Haraguchi et al. | 354/195.12 X |
| 5,012,273 | 4/1991 | Haraguchi et al. | 354/195.1 |
| 5,016,032 | 5/1991 | Haraguchi et al. | 354/195.1 |
| 5,103,251 | 4/1992 | Kudo | 354/195.1 |
| 5,142,315 | 8/1992 | Haraguchi et al. | 354/199 |
| 5,144,493 | 9/1992 | Nomura | 354/195.12 |
| 5,150,145 | 9/1992 | Haraguchi et al. | 354/199 X |
| 5,157,429 | 10/1992 | Haraguchi et al. | 354/199 X |
| 5,214,462 | 5/1993 | Haraguchi et al. | 354/195.1 X |

FOREIGN PATENT DOCUMENTS 1268998 3/1972 United Kingdom .

OTHER PUBLICATIONS

United Kingdom Search Report, May 13, 1993.

*Primary Examiner*—W. B. Perkey
*Attorney, Agent, or Firm*—Sandler, Greenblum & Bernstein

[57] ABSTRACT

An electrically driven zoom lens camera includes a zoom lens barrel having a cam ring, a motor which rotates the cam ring through a gear train including a terminal gear connected to the cam ring, and a pair of component accommodating spaces which are defined by and between a cylindrical portion of the zoom lens barrel and upper and lower wall surfaces of a camera body, so that the motor and the terminal gear of the gear train are located in respective component accommodating spaces.

30 Claims, 5 Drawing Sheets

ZOOM LENS CAMERA WITH DRIVE MOTOR AND GEAR TRAIN

BACKGROUND OF THE INVENTION

1. Field of the Invention

The present invention relates to a camera having a motor driven zoom lens (referred to as an electrically driven zoom lens camera).

2. Description of Related Art

In a known electrically driven zoom lens camera, and particularly in a known compact, electrically driven zoom lens camera, a rotatable driving member, such as a cam ring, is rotated to move a group of variable power lenses in an optical axis direction to thereby effect a zooming operation. The cam ring is driven by a motor through a gear train connected to the motor. To miniaturize such an electrically driven zoom lens camera, improvements have focused on the location of the drive motor, a drive mechanism of a zoom lens barrel, and a terminal gear of the gear train, etc. These are all relatively large internal components of the camera.

SUMMARY OF THE INVENTION

The primary object of the present invention is to provide a small electrically driven zoom lens camera in which a motor and/or a terminal gear of a gear train connected to the motor, to rotate a rotatable driving member (e.g., cam ring), are compactly arranged so as to minimize the size of the camera body.

Another object of the present invention is to provide a small electrically driven zoom lens camera in which a drive mechanism of a zoom lens barrel is compactly arranged and which has an improved light intercepting apparatus which effectively intercepts light around the drive mechanism of the zoom lens barrel.

The inventors of the present invention have focused on an internal space existing between a cylindrical portion, in which the circular zoom lens barrel is accommodated, and flat upper and lower walls of the camera body, as viewed the front of the camera. This space inevitably exists even if the upper and lower walls are located as close as possible to the cylindrical portion, provided that the zoom lens barrel is cylindrical.

According to present invention, there is provided an electrically driven zoom lens camera including a zoom lens barrel having a rotatable driving member and a variable lens group which is moved in an optical axis direction by the rotation of the driving member. A camera body is provided having an aperture which defines a size of a picture to be taken, and a cylindrical portion in which the zoom lens barrel is accommodated. The aperture and cylindrical portion are arranged along the optical axis. At least one component accommodating chamber which is provided is defined by and between the cylindrical portion and at least one of upper and lower wall surfaces of the camera body in a front elevational view, wherein a motor which rotates the rotatable driving member, through a gear train, is housed in the component accommodating chamber.

According to another aspect of the present invention, there is provided an electrically driven zoom lens camera, wherein a zoom lens barrel of the zoom lens camera has a rotatable driving member and a variable lens group which is moved in an optical axis direction by the rotation of the rotatable driving member. A camera body of the zoom lens camera has an aperture which defines a picture size on an image area of a film and is located on an optical axis of the zoom lens barrel, a motor is provided which rotates the rotatable driving member through a gear train, in addition to a cylindrical portion in which the zoom lens barrel is accommodated. A motor is housed in one of a pair of component accommodating chambers which are defined by and between the cylindrical portion and at least one of upper and lower wall surfaces of the camera body in a front elevational view.

With this structure, the component accommodating chamber is formed by the inevitable space that exists between the upper and/or lower wall surfaces of the camera body and the cylindrical portion in which the circular zoom lens barrel is housed. Accommodation of the motor in the component accommodating chamber contributes to a realization of a compact camera.

Preferably, there are upper and lower component accommodating chambers on one side of the zoom lens barrel, as viewed from the front, one of which accommodates the motor, the other of which accommodates the terminal gear of the gear train.

According to another aspect of the present invention, there is provided an electrically driven zoom lens camera including a zoom lens barrel having a rotatable driving member provided with a peripheral gear, so that a zooming operation is carried out by the rotation of the rotatable driving member, and a camera body having a cylindrical portion in which the zoom lens barrel is accommodated. The cylindrical portion has an opening formed thereon in which a drive pinion is provided to engage with the rotatable driving member of the zoom lens barrel. A light intercepting plate is provided which supports the drive pinion and is arranged on the outside of the cylindrical portion in a manner which prevents harmful light from reaching the aperture.

With this arrangement, the drive pinion is located in the opening formed in the cylindrical portion in which the zoom lens barrel is housed. Accordingly, the drive mechanism can be simplified and miniaturized. Furthermore, the light intercepting plate (i.e., supporting plate) effectively prevents light from entering at the front end of the cylindrical portion.

Preferably, a provision is made for a second light intercepting plate which supports the gear train and which is attached to the front end surface of the cylindrical portion of the camera body together with the first light intercepting plate. The second light intercepting plate assists in the interception of light. Preferably, the second light intercepting plate is superimposed on the first light intercepting plate.

The present disclosure relates to subject matter contained in Japanese Patent Application No. HEI 4-98260 (filed on Apr. 17, 1992), and Japanese Utility Model Application No. HEI 4-24853 (filed on Apr. 17, 1992), which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENTS

Figure 1:
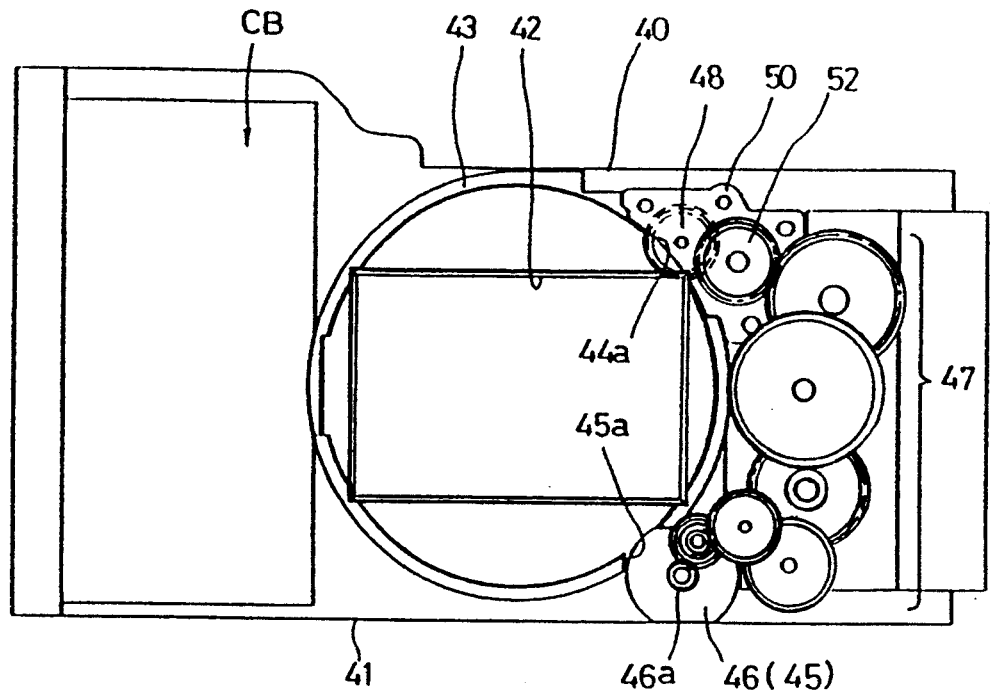
FIG. 1 is a front elevational view of main components of an electrically driven zoom lens camera, with a removed gear train supporting plate, according to the present invention.
Figure 2:
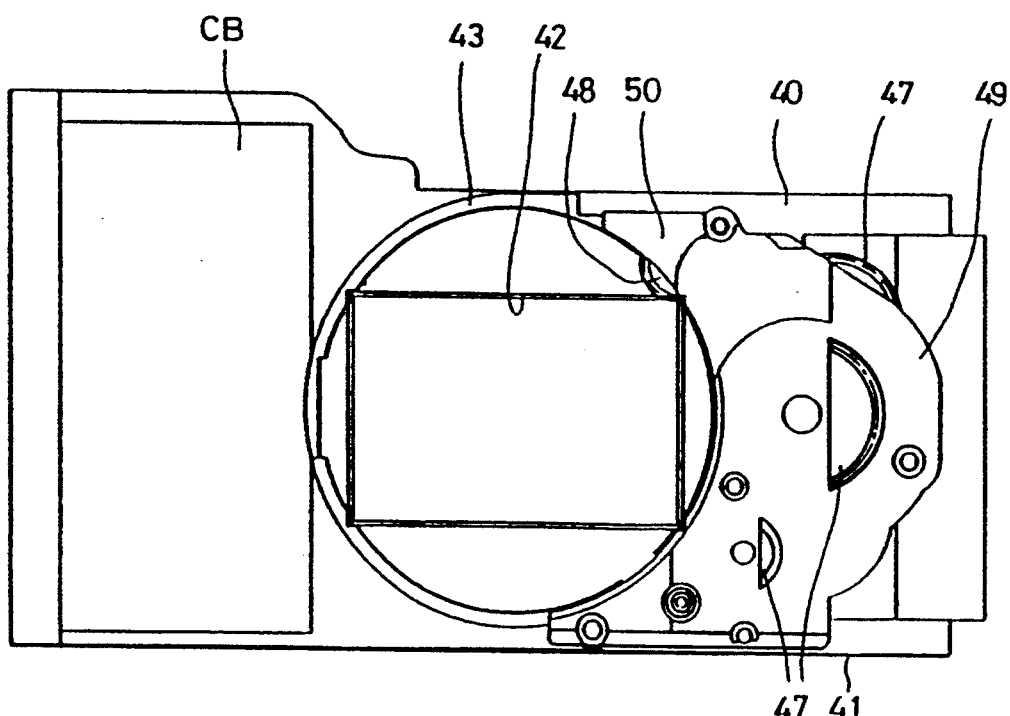
FIG. 2 is a front elevational view of main components of an electrically driven zoom lens camera, with a gear train supporting plate, according to the present invention.
Figure 3:
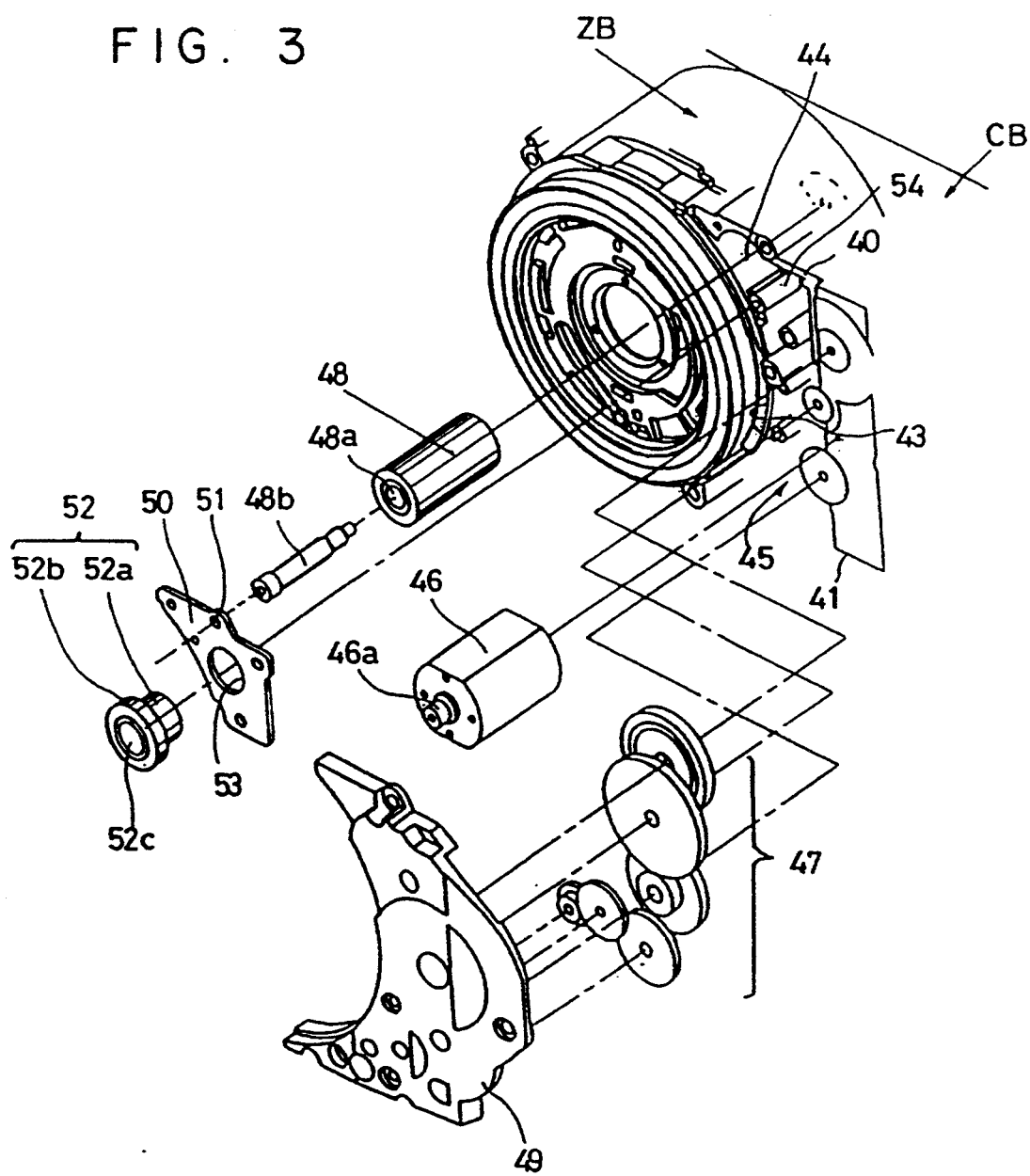
FIG. 3 is an exploded perspective view of an electrically driven zoom lens camera shown in FIGS. 1 and 2.

FIGS. 1 through 3 particularly show the improvement of the present invention. In FIGS. 1 through 3, a camera body CB which is generally rectangular in a front elevational view has parallel upper and lower wall surfaces (i.e., outer walls) 40 and 41. The camera body CB is provided with a photographic aperture 42 and a cylindrical portion 43 in which a zoom lens barrel ZB is accommodated. As is well known, the aperture 42 has a center located on an optical axis O (FIG. 4) of the zoom lens barrel ZB and defines a size of an object image to be formed in the form of a rectangle on a film by the zoom lens barrel ZB.

The upper and lower wall surfaces 40 and 41 of the camera body CB are shaped to be as close as possible to the zoom lens barrel ZB so as to miniaturize the camera body. Nevertheless, there are inevitably spaces that exist between the upper and lower wall surfaces 40 and 41, and the upper and lower portions of the circular periphery of the zoom lens barrel ZB, respectively, on the right and left sides of the zoom lens barrel as long as the upper and lower wall surfaces 40 and 41 are defined by flat plates.

In the illustrated embodiment, the cylindrical portion 43 is provided on the peripheral surface thereof with cut-away portions (i.e., recesses) 44a and 45a which are provided on the right side of the zoom lens barrel ZB in a front elevational view to define component accommodating spaces (i.e., chambers) 44 and 45. In the illustrated embodiment, a motor 46 is accommodated in the component accommodating space 44. A terminal gear 48 of a gear train 47, which is driven by the drive motor 46, is accommodated in the component accommodating space 45, respectively.

Since the accommodating spaces 44 and 45 are formed by the recesses 44a and 45a which are in turn formed by pertly cutting the peripheral portion of the circular cylindrical portion 43, so that the accommodating spaces 44 and 45 open into the front end face of the zoom lens barrel ZB, there is a possibility of light leakage from the outer peripheral portion and the front end face of the cylindrical portion 43. The solution to this problem will be discussed below.

The upper and lower wall surfaces 40 and 41, which define the accommodating spaces 44 and 45, can be partly cut off. In this alternative, the accommodating spaces 44 and 45 are defined by projections of the upper and lower wall surfaces 40 and 41 and the zoom lens barrel ZB (i.e., cylindrical portion 43).

An assembly of the gear train 47 and the motor 46 is integrally supported by a gear supporting large plate (i.e., light intercepting plate) 49 to transmit the rotation of a pinion 46a of the drive motor 46 to the terminal gear 48.

Figure 4:
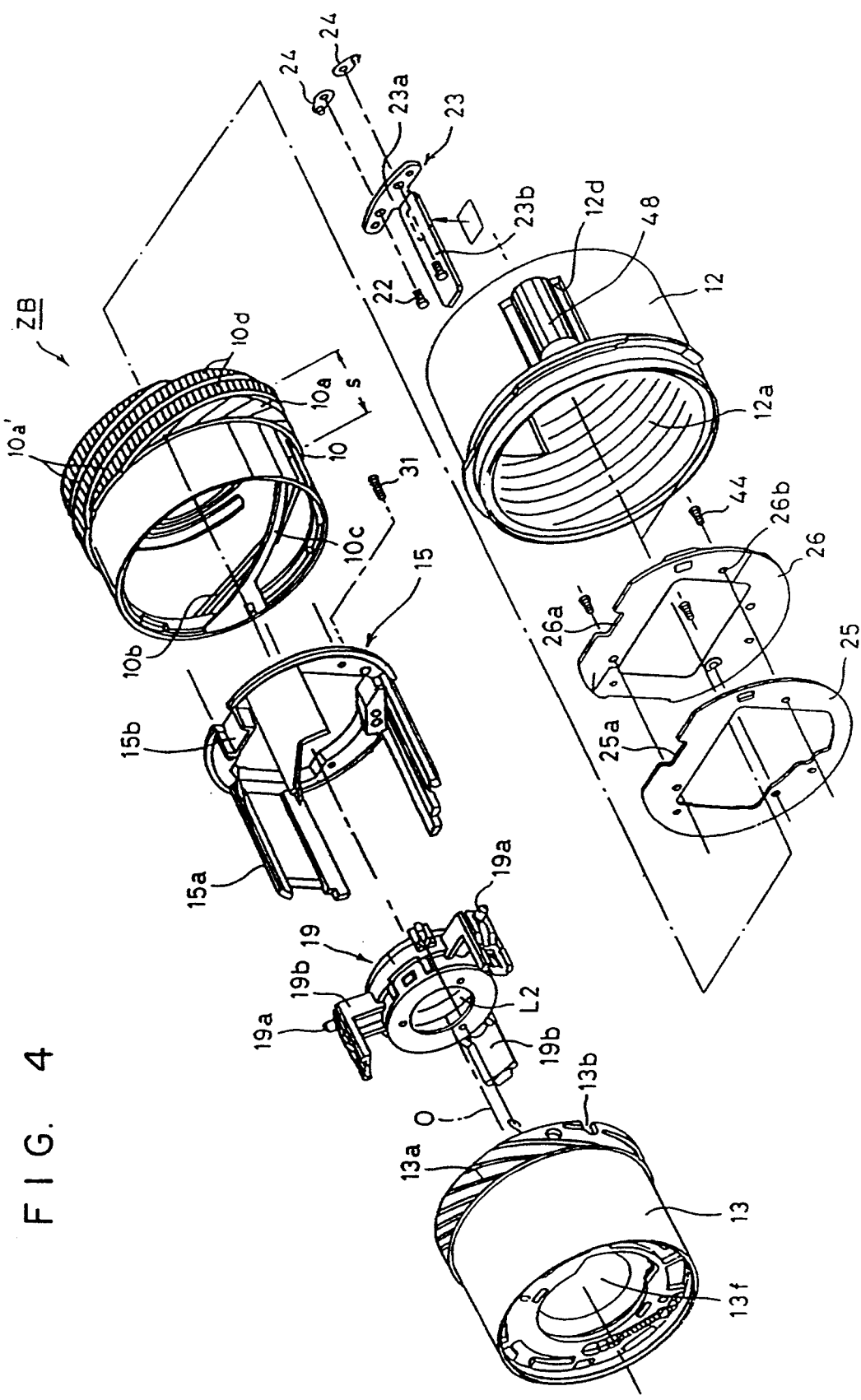
FIG. 4 is an exploded perspective view of a zoom lens barrel, according to the present invention.
Figure 5:
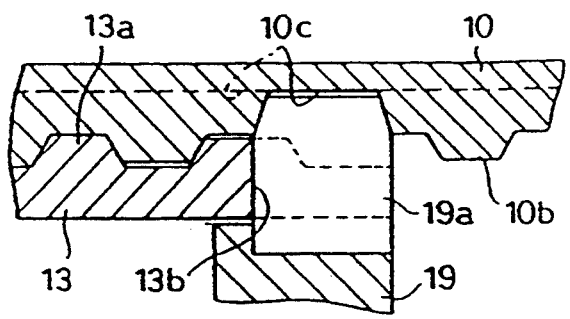
FIG. 5 is a sectional view of a zoom lens barrel according to the present invention, in which an upper half corresponds to a wide-angle position and a lower half corresponds to a telephoto position, respectively.
Figure 6:
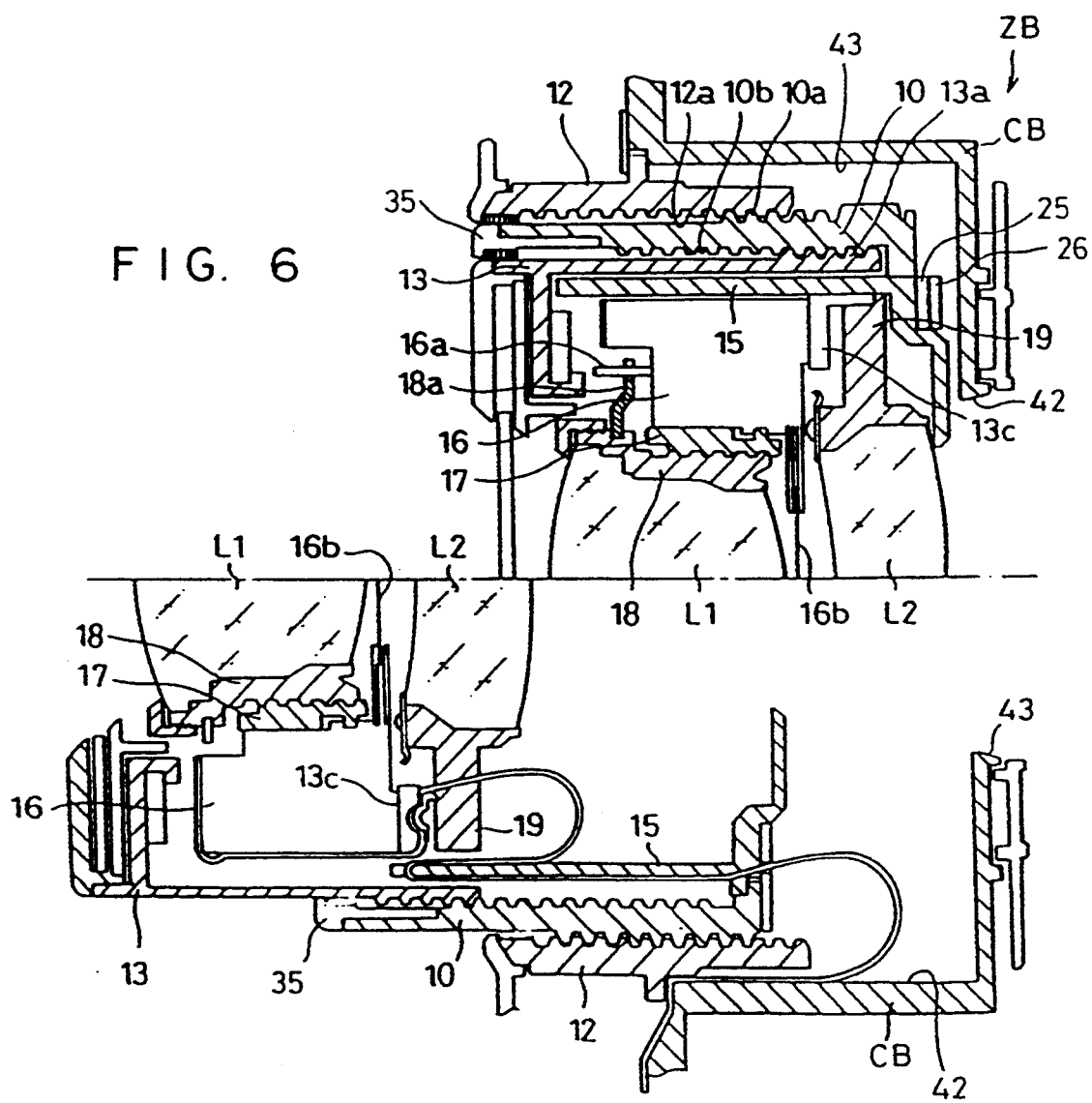
FIG. 6 is an enlarged sectional view of a cam pin engaged in an associated cam groove of a zoom lens barrel shown in FIGS. 4 and 5; and, FIG. 7 is a developed view of a terminal gear of a gear train of a driving apparatus and a gear of a cam ring in mesh with the terminal gear, according to the present invention.

As can be seen in FIG. 4, the terminal gear 48 is exposed into a helicoid ring 12 through an opening 12d of the helicoid ring 12, so that the terminal gear 48 is in mesh with a gear 10d provided on the outer peripheral surface of a cam ring 10 of the zoom lens barrel ZB to rotate the cam ring 10. The terminal gear 48 is inserted in the accommodating space 44 and the opening 12d. Thereafter, a pin 48b is inserted in an axial hole 48a of the terminal gear 48, as shown in FIG. 3. The front end of the pin 48b is inserted and supported in a corresponding supporting hole (not shown) of the camera body CB. The rear end of the pin 48b is supported in a supporting hole 51 of a gear supporting small plate (i.e., small light intercepting plate) 50 secured to the camera body CB. The gear supporting small plate 50 is provided with an insertion hole 53 in which a stepped gear 52, having a small gear 52a, which is in mesh with the terminal gear 48, and a large gear 52b which is integral with and coaxial to the small gear 52a, is inserted. The stepped gear 52 has an axial hole 52c in which a supporting shaft 54 of the camera body CB is rotatably inserted. The large gear 52b is in mesh with the gear train 47.

To assemble the terminal gear 48, the gear supporting small plate 50, the stepped gear 52, the gear supporting large plate 49, the terminal gear 48, the pin 48b, and the gear supporting small plate 50 are supported by the camera body CB. Thereafter, the small gear 52a of the stepped gear 52 is inserted in the insertion hole 53 of the light intercepting plate 50 to engage the small gear 52a with the terminal gear 48, and is rotatably supported by the camera body CB.

The supporting shaft 54 of the camera body CB is rotatably inserted in the axial hole 52c of the stepped gear 52. Thereafter, the gear supporting large plate 49, which integrally supports the drive motor 46 and the gear train 47, is secured to the camera body CB, so that the gear supporting small plate 50 is covered by a part of the gear supporting large plate 49. The gear supporting small plate 50 extends along the profile of the cylindrical portion 43 and covers the front end of the accommodating space 44, so that when the gear supporting small plate 50 is secured to the front end of the camera body CB, the gear supporting small plate 50 prevents light from entering through the front end face of the accommodating space 44. Namely, the gear supporting small plate 50 functions as a small light intercepting plate.

The gear train supporting large plate 49 is provided with an axial hole (not shown) in which the supporting shaft 54 is inserted, so that when the large plate 49 is superimposed on the small plate 50, no accidental detachment of the stepped gear 52 takes place, thus, the gear train mechanism is completed. Note that the large plate 49 covers not only the small plate 50 but also the front end of the accommodating space 45. Accordingly, the large plate 49 functions as a large light intercepting plate.

When the terminal gear 48 is rotated to rotate the cam ring 10, the zooming of the zoom lens barrel ZB is carried out. Note that the subject of the present invention is not directly addressed to the internal structure of the zoom lens barrel. FIGS. 4 through 7 show a zoom lens barrel by way of example.

The helicoid ring 12, which is inserted in and secured to the cylindrical portion 43 of the camera body CB, is provided with a female helicoid 12a which is in mesh with the male helicoid 10a provided on the outer peripheral surface of the cam ring 10. The cam ring 10 is provided on an inner peripheral surface thereof with a female helicoid 10b and an inner cam groove 10c. A male helicoid 13a of a front lens barrel 13 is screw-engaged in the female helicoid 10b. Light intercepting plates 25 and 26 are provided behind the rear end of the cam ring 10. The light intercepting plates 25 and 26 are provided on the upper ends thereof with positioning recesses 25a and 26a, so that a guide portion 23b of a linear movement guide 23, secured to the camera body, can be fitted in the positioning recesses 25a and 26a of the light intercepting plates 25 and 26 and in a positioning recess 15b provided on a linear movement guide ring 15. The light intercepting plates 25 and 26 are secured to the linear movement guide ring 15, so that the positioning recesses 25a and 26a of the light intercepting plates 25 are aligned with the positioning recess 15b of the linear movement guide ring 15. The cam ring 10 is rotatably fitted on the linear movement guide ring 15. The linear movement guide 23 is secured to securing members 24 secured to the camera body by set screws 22, so that the guide portion 23b of the linear movement guide 23 extends in an optical axis direction.

A shutter holding frame 13c, to which a rear end of an annular shutter unit 16 is secured, is secured to the front lens barrel 13 which is linearly moved along a linear movement guide portion 15a of the linear movement guide ring 15. The shutter unit 16 is provided on an inner peripheral surface thereof with a helicoid ring 17 integral therewith, which is screw-engaged by a front lens frame 18 which holds a front lens group L1. The shutter unit 16 has a drive pin 16a which is engaged by a driven pin 18 provided on the front lens frame 18 integral therewith.

As is well known, the drive pin 16a is rotated by a predetermined angle in accordance with an object distance signal sent from an object distance meter (not shown), so that the rotation of the drive pin 16a is transmitted to the front lens frame 18 through the driven pin 18a. As a result, the front lens frame 18 and, accordingly, the front lens group L1 are moved in the optical axis direction while being rotated to effect the focusing. The shutter unit 16 opens and closes shutter blades 16b in accordance with a brightness signal of an object to be taken. Numeral 13f designates a lens aperture 13f in FIG. 4.

A rear lens frame 19, which holds a rear lens group L2, is fitted in the cam ring 10 and has a cam pin 19a which projects in the radial direction. The cam pin 19a is fitted in the inner cam groove 10c of the cam ring 10. The rear lens frame 19 is provided with a linear movement guide portion 19c which is engaged by a linear movement guide portion (not shown) of the front lens barrel 13 (i.e., shutter supporting frame 13c). The front lens barrel 13 is linearly guided by the linear movement guide ring 15. The rear lens frame 19 is linearly guided by the front lens barrel 13. Accordingly, the front lens barrel 13 and the rear lens frame 19 can be linearly moved in the optical axis direction.

The cam ring 10 is provided on the rear portion thereof with a male helicoid 10a and a plurality of parallel gears 10d, each consisting of a spur gear whose teeth are parallel with the axis of the cam ring 10. The gears 10d are inclined in the same direction as the threads of the male helicoid 10a. Threads 10a' are provided between the adjacent gears 10d, respectively. Namely, one thread 10a' is each provided between the two adjacent gears 10d. In other words, the male helicoid 10a is partly cut away in the circumferential direction so as to provide the threads 10a', so that the gears 10d are formed in the cut-away portions. In the illustrated embodiment, the helicoid 10a consists of three threads, so that the gears 10d are provided in the cut-away portions of two of the three threads. The male helicoid 10a, the threads 10a', and the gears 10d have the same axial length s.

The helicoid ring 12 is provided on the inner peripheral surface thereof with a female helicoid 12a and relief grooves, etc., corresponding to the male helicoid 10a, the threads 10a' and the three gears 10d of the cam ring 10, respectively. Namely, when the cam ring 10 is rotated in accordance with the screw-engagement of the male helicoid 10a (threads 10a') and the female helicoid 12a, the gears 10d are moved in the relief grooves in a non-contact fashion.

The helicoid ring 12 is provided on the peripheral surface thereof with a recess 12d, so that the terminal gear 48 can be engaged by the gears 10d through the recess 12d. The terminal gear 48 has an axial length (width) large enough to simultaneously come into engagement with all of the three gears 10d. Nevertheless, the terminal gear 48 engages only with the rearmost gear 10d and the frontmost gear 10d at a front extremity position and a rear extremity position of the cam ring 10 in the axial direction, respectively. The engagement is shown in FIG. 7.

Figure 7:
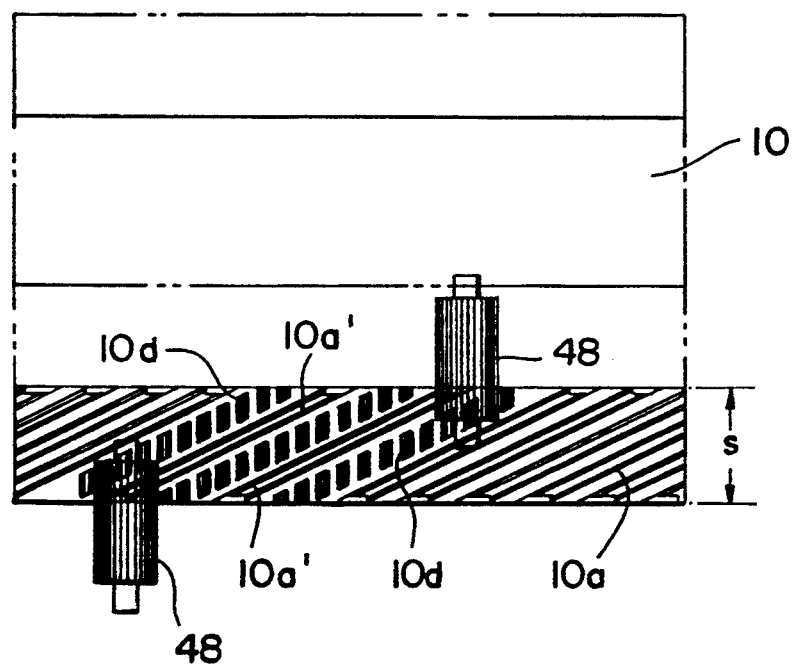

In FIG. 7, it is assumed for convenience' sake that the terminal gear 48 is moved in the optical axis direction and no change of the axial position of the cam ring 10 takes place. However, actually, the cam ring 10 is moved in the optical axis direction and no movement of the gear 48 in the optical axis direction takes place.

In the zoom lens camera, as constructed above, when the drive motor 46 is rotated in the forward or reverse direction, the rotation of the pinion 46a thereof is transmitted to the terminal gear 48 through the gear train 47 and the stepped gear 48. The rotation of the terminal gear 48 is then transmitted to the cam ring 10 through the gears 10d, so that the cam ring 10 is moved in the optical axis direction in accordance with the engagement of the male helicoid 10a and the female helicoid 12a. At the same time, the front lens barrel 13 and, accordingly, the front lens group L1 are moved in the optical axis direction in accordance with the engagement of the female helicoid 10b and the male helicoid 13a, and the linear guide mechanism of the shutter holding frame 13c and linear movement guide ring 15. The rotation of the cam ring 10 causes the rear lens frame 19 (i.e., rear lens group L2) to move in the optical axis direction in accordance with the engagement of the cam pin 19a provided on the rear lens frame 19 in the inner cam groove 10c of the inner surface of the cam ring 10, and the linear guide mechanism of the rear lens frame 19 and linear movement guide ring 15. As a result, the spatial distance between the front lens group L1 and the rear lens group L2 is varied to effect the zooming operation.

We claim:

1. An electrically driven zoom lens camera comprising:
   a zoom lens barrel having a rotatable driving member and a variable lens group which is moved in an optical axis direction by rotation of said driving member, a camera body having an aperture which defines a size of a picture to be taken, upper and lower wall surfaces in a elevational view, and a cylindrical portion in which said zoom lens barrel is accommodated, said aperture and said cylindrical portion being arranged along the optical axis direction, and a plurality of component accommodating chambers which are each defined by and between said cylindrical portion and one of said upper and lower wall surfaces of said camera body, said cylindrical portion extending between said upper and lower wall surfaces, a diameter of said cylindrical portion substantially perpendicular to said wall surfaces corresponding to a distance between said wall surfaces, said component accommodating chambers being offset with respect to said diameter, and a motor which rotates said rotatable driving member through a gear train, said motor and a terminal gear of said gear train are each housed in individual ones of said component accommodating chambers.

2. An electrically driven zoom lens camera according to claim 1, wherein said pair of component accommodating chambers are located on either the right or left side of the cylindrical portion in a front elevational view.

3. An electrically driven zoom lens camera according to claim 1, further comprising a terminal pinion gear which is rotated by said motor, and a supporting plate which supports said pinion gear, said supporting plate being shaped and arranged so that the supporting plate can prevent harmful light from reaching said aperture.

4. An electrically driven zoom lens camera according to claim 3, further comprising a second supporting plate which supports said gear train, said gear train transmitting a rotation of said motor to said terminal gear, wherein said second supporting plate is shaped and arranged so as to prevent harmful light from reaching said aperture.

5. An electrically driven zoom lens camera according to claim 4, wherein said second supporting plate is superimposed on said supporting plate.

6. An electrically driven zoom lens camera according to claim 1, wherein said rotatable driving member is provided with a gear at a circumferential portion thereof, and wherein a terminal pinion gear of said gear train is in mesh with said gear of the rotatable driving member.

7. An electrically driven zoom lens camera according to claim 6, wherein said cylindrical portion has an opening through which said terminal pinion gear is meshed with said gear of the rotatable driving member.

8. An electrically driven zoom lens camera according to claim 7, further comprising a first light intercepting plate which supports said terminal pinion gear, said first light intercepting plate being shaped and arranged to prevent harmful light from reaching said opening.

9. An electrically driven zoom lens camera according to claim 7, further comprising a second light intercepting plate which supports said gear train, wherein said second light intercepting plate is shaped and arranged to prevent harmful light from reaching said opening.

10. An electrically driven zoom lens camera according to claim 9, wherein said second light intercepting plate is superimposed on said first light intercepting plate.

11. The electrically driven zoom lens camera according to claim 1, said cylindrical portion being contiguous to said upper and lower wall surfaces of said camera body at opposite ends of said diameter, said gear train being contained between said upper and lower wall surfaces.

12. The electrically driven zoom lens camera according to claim 1, said gear train being positioned around a part of said cylindrical portion on one side of said diameter.

13. The electrically driven zoom lens camera according to claim 1, said component accommodating chambers being symmetrically arranged about said cylindrical portion, along diameters bisecting quadrants of said cylindrical portion defined by said diameter and by a diameter parallel to said wall surfaces.

14. An electrically driven zoom lens camera, wherein a zoom lens barrel of said zoom lens camera has a rotatable driving member and a variable lens group which is moved in an optical axis direction by rotation of said rotatable drive member, and wherein a camera body of said zoom lens camera has an aperture which defines a picture size on an image area of a film and is located on an optical axis of said zoom lens barrel, a motor which rotates said rotatable driving member through a gear train, and a cylindrical portion in which said lens barrel is accommodated, said motor housed in one of a pair of component accommodating chambers which are defined by and between said cylindrical portion and one of said upper and lower wall surfaces of said camera body in a front elevational view, a diameter of said cylindrical portion substantially perpendicular to said wall surfaces corresponding to a distance between said wall surfaces, said component accommodating chambers being offset from said diameter.

15. An electrically driven zoom lens camera according to claim 14, wherein said rotatable driving member is a cam ring.

16. An electrically driven zoom lens camera according to claim 14, wherein said gear train includes a terminal gear connected to the rotatable driving member, and wherein said terminal gear of the gear train is housed the other of said pair of component accommodating chambers.

17. An electrically driven zoom lens camera according to claim 16, wherein said rotatable driving member is a cam ring.

18. The electrically driven zoom lens camera according to claim 14, said gear train contained between said upper and lower wall surfaces of said camera body.

19. The electrically driven zoom lens camera according to claim 14, said gear train being positioned about a part of said cylindrical portion on one side of said diameter.

20. The electrically driven zoom lens camera according to claim 14, a terminal gear of said gear train housed in a second of said pair of component accommodating chambers.

21. The electrically driven zoom lens camera according to claim 14, said component accommodating chambers being symmetrically arranged about said cylindrical portion, along diameters bisecting quadrants of said cylindrical portion defined by said diameter and by a diameter parallel to said wall surfaces.

22. An electrically driven zoom lens camera comprising:

a zoom lens barrel having a rotatable driving member provided with a peripheral gear, so that a zooming operation is carried out by rotation of said rotatable driving member, a camera body having a cylindrical portion in which said zoom lens barrel is accommodated, said cylindrical portion having an opening formed thereon in which a drive pinion is provided to engage with said rotatable driving member of said zoom lens barrel, said cylindrical portion having a diameter substantially perpendicular to said wall surfaces, said diameter corresponding to a distance between upper and lower camera body wall surfaces, said pinion being contained within a space defined between said wall surfaces, and a light intercepting plate which supports said drive pinion and which is arranged on an outside of said cylindrical portion in a manner which prevents harmful light from reaching a film frame defining aperture.

23. An electrically driven zoom lens camera according to claim 22, wherein a gear train is provided to rotate the rotatable driving member.

24. An electrically driven zoom lens camera according to claim 23, wherein a second light intercepting plate which supports the gear train is arranged on the outside of said cylindrical portion together with the first light intercepting plate.

25. An electrically driven zoom lens camera according to claim 24, wherein said second light intercepting plate is superimposed on said first light intercepting plate.

26. The electrically driven zoom lens camera according to claim 22, said cylindrical portion and said upper and lower wall surfaces defining four component accommodating chambers each offset with respect to said wall surfaces and said diameter, and between said cylindrical portion and said wall surfaces.

27. The electrically driven zoom lens camera according to claim 22, said drive pinion and a motor connected to said drive pinion by a gear train positioned within individual ones of said component accommodating chambers defined by said cylindrical portion and said wall surfaces.

28. The electrically driven zoom lens camera according to claim 22, said cylindrical portion being contiguous with said upper and lower camera body wall surfaces at opposite ends of said diameter, said cylindrical portion and said upper and lower wall surfaces defining a plurality of component accommodating chambers positioned about an optical axis of said zoom lens barrel, said drive pinion being positioned in a first of said component accommodating chambers and a drive motor for driving said drive pinion being accommodated in an adjacent component accommodating chamber.

29. The electrically driven zoom lens camera according to claim 28, a gear train connecting said driving motor to said drive pinion contained between said upper and lower camera body wall surfaces and extending around a part of said cylindrical portion.

30. The electrically driven zoom lens camera according to claim 22, said component accommodating chambers being symmetrically arranged about said cylindrical portion, along diameters bisecting quadrants of said cylindrical portion defined by said diameter and by a diameter parallel to said wall surfaces.

* * * * *

UNITED STATES PATENT AND TRADEMARK OFFICE
CERTIFICATE OF CORRECTION

PATENT NO. : 5,349,408
DATED : SEPTEMBER 20, 1994
INVENTOR(S) : Hiroshi NOMURA et al.

It is certified that error appears in the above-indentified patent and that said Letters Patent is hereby corrected as shown below:

At column 7, line 5 (claim 1, line 9) of the printed patent, change "a elevational" to ---a front elevational---.

Signed and Sealed this

Ninth Day of May, 1995

Attest:

BRUCE LEHMAN

Attesting Officer  Commissioner of Patents and Trademarks